United States Patent [19]

Fukuda et al.

[11] Patent Number: 4,851,930
[45] Date of Patent: Jul. 25, 1989

[54] MAGNETIC RECORDING AND REPRODUCING APPARATUS COMPENSATING FOR THE DEVIATION OF H ALIGNMENT DURING A VARIABLE SPEED REPRODUCTION

[75] Inventors: Tokuya Fukuda, Tokyo; Takamitsu Aoki, Kanagawa, both of Japan

[73] Assignee: Sony Corporation, Tokyo, Japan

[21] Appl. No.: 5,251

[22] Filed: Jan. 20, 1987

[30] Foreign Application Priority Data

Jan. 22, 1986 [JP] Japan ................................. 61-10223

[51] Int. Cl.⁴ .............................................. K04N 5/78
[52] U.S. Cl. ................................. 360/10.1; 360/10.3; 358/312
[58] Field of Search ............................ 360/10.1, 10.3; 358/312

[56] References Cited

U.S. PATENT DOCUMENTS 4,623,940 11/1986 Matsumoto et al. ............ 358/312 X
4,672,469 6/1987 Namiki et al. ...................... 358/312

FOREIGN PATENT DOCUMENTS

0136816 8/1982 European Pat. Off. .
0102809 8/1983 European Pat. Off. .
56-35570 12/1981 Japan .
61-288676 12/1986 Japan .

Primary Examiner—Aristotelis M. Psitos
Attorney, Agent, or Firm—Philip M. Shaw, Jr.

[57] ABSTRACT

A magnetic recording and reproducing apparatus having a delay circuit with a plurality of output terminals, one output terminal providing a delayed output video signal for which a delay amount corresponding to a deviation of an H alignment between adjoining record tracks is provided and another output terminal providing another delayed output video signal for which a delay amount corresponding to one horizontal synchronization interval (1H) is provided, and having signal selection switch circuitry which sequentially selects the reproduced video signal to be sent to the delay circuit and which also selects the delayed reproduced video signal during an interval for which an auxiliary head is selected in place of a normal record/playback head in a variable speed reproduction mode, so that a reproduced video signal with continuous H alignment can be secured and video images with a good picture quality can be achieved.

15 Claims, 6 Drawing Sheets

FIG. 5 TRACK PATTERN OF LP MODE

FIG. 6 TRACK PATTERN OF SP MODE

MAGNETIC RECORDING AND REPRODUCING APPARATUS COMPENSATING FOR THE DEVIATION OF H ALIGNMENT DURING A VARIABLE SPEED REPRODUCTION

BACKGROUND OF THE INVENTION

The present invention relates to a magnetic recording and reproducing apparatus having a variable speed reproducing function for reproducing a video signal which has been recorded with an H alignment which deviates between adjacent record tracks, and which is applicable, but not exclusively, to an 8 mm video tape recorder (VTR), etc.

In general, in a helical scan type VTR which carries out recording and reproduction of a video signal by means of at least one rotary magnetic head, the video signal corresponding to one field is sequentially recorded through a predetermined azimuth angle of the head on each slanted recording track on a magnetic tape. A four-head type VTR has conventionally been used in which a pair of normal playback heads are alternated with a pair of auxiliary heads each having an inverse azimuth angle with respect to each normal playback head and used for a variable speed reproduction so that the variable speed reproduction operation can carried out.

When the variable speed reproduction is carried out by such kinds of VTRs, the continuity of the horizontal synchronization (H) can be maintained even in a track jump operation provided that recorded positions of horizontal synchronization signals of the video signal on the magnetic tape are aligned between adjacent tracks, i.e. a record format which has taken an H alignment. It is noted that the H alignment is represented by a distance between respective record starting points of adjoining tracks divided by a length of one horizontal synchronization period. If the value of H alignment=0.5H×(odd number), since one field=262.5H, the tracks are completely aligned.

On the other hand, in a record format which deviates from H alignment between adjoining tracks, it is necessary to delay the reproduced video signal from the recorded tracks by a constant interval of time in order to correct for the deviation of the H alignment.

Figure 5:
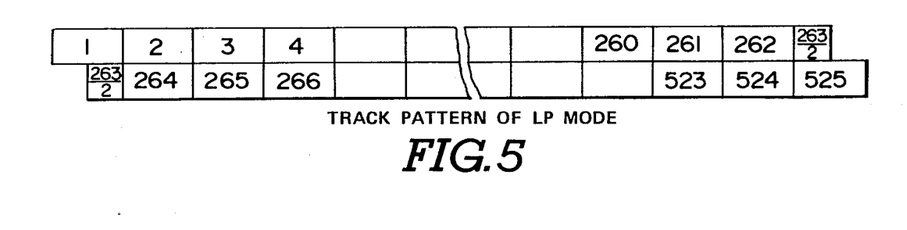
FIG. 5 is a schematic diagram of a record format of an LP mode in a conventional 8 mm VTR.
Figure 6:
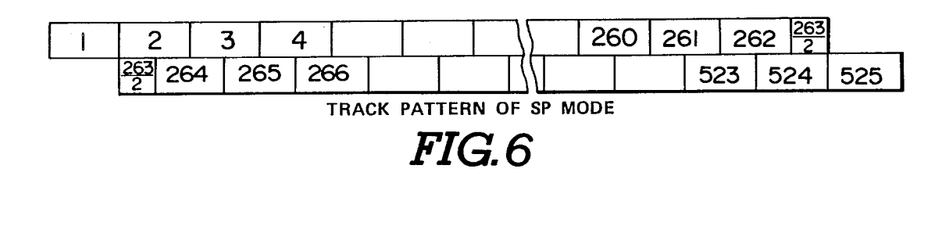
FIG. 6 is a schematic diagram of a record format of an SP mode in the conventional 8 mm VTR.

For example, an 8 mm VTR has an LP (Long Play) mode of the record format which takes an H alignment (0.5H alignment) as shown in FIG. 5 and an SP (Standard Play) mode of the record format in which the H alignment is deviated (1.0H alignment) as shown in FIG. 6.

Figure 7:
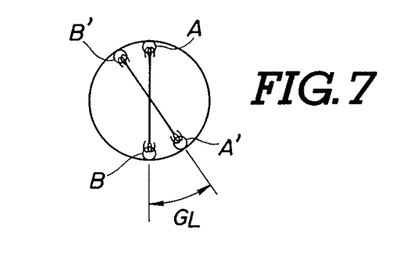
FIG. 7 is a schematic diagram of a head arrangement in a conventional 8 mm VTR.

FIG. 7 shows a conventional head arrangement of a four-head type 8 mm VTR in a rotary drum.

As shown in FIG. 7, suppose that a gap interval (GL) between each normal playback head A, B and each auxiliary head A', B' used for the variable speed reproduction corresponds to 2H. It is, then, necessary to delay the reproduced video signal by 0.5H to correct for the deviation of H alignment when the reproduced video signal is derived through the auxiliary heads A', B' in the SP track pattern mode. Therefore, in the conventional method, an 8 mm VTR having a variable speed reproduction operation mode is provided with a 0.5H delay line 63 having a delay corresponding to 0.5H in the processing system for the reproduced luminance signal PB.Y, as shown in FIG. 8, so that continuity of H is assured.

Figure 8:
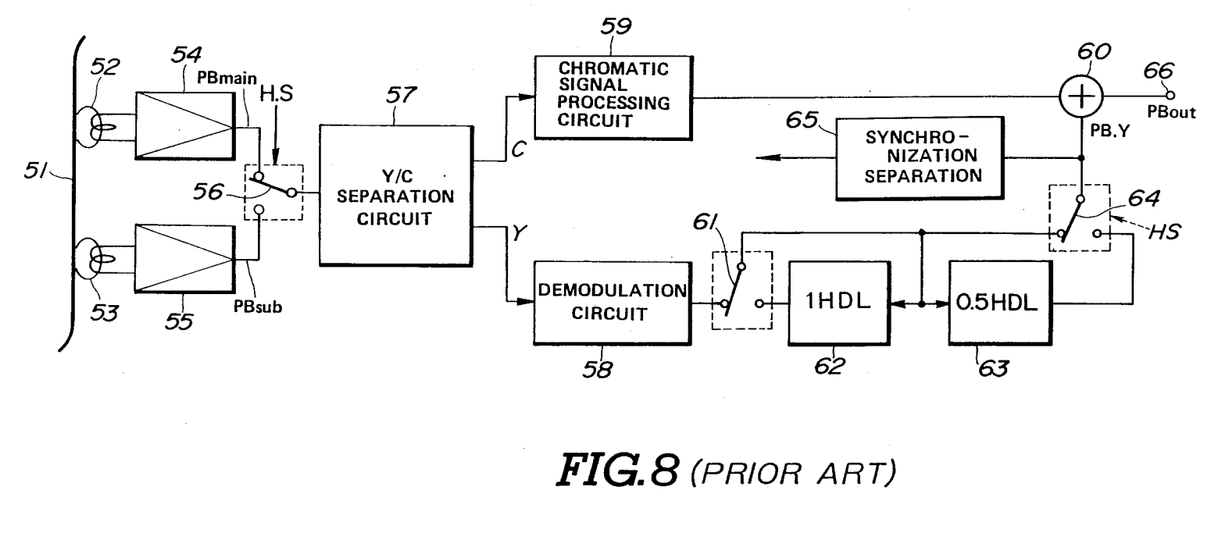
FIG. 8 is a circuit block diagram of the reproduction system in a conventional 8 mm VTR having a variable speed reproduction function.

FIG. 8 is a block diagram of a conventional VTR. A reproduced video signal PBmain derived through the normal playback head 52 from the magnetic tape 51 and another reproduced video signal PBsub derived through the auxiliary head 53 are amplified through respective playback amplifiers 54, 55 and sent to a Y/C separation circuit 57 via a signal selection switch 56.

Figure 9:
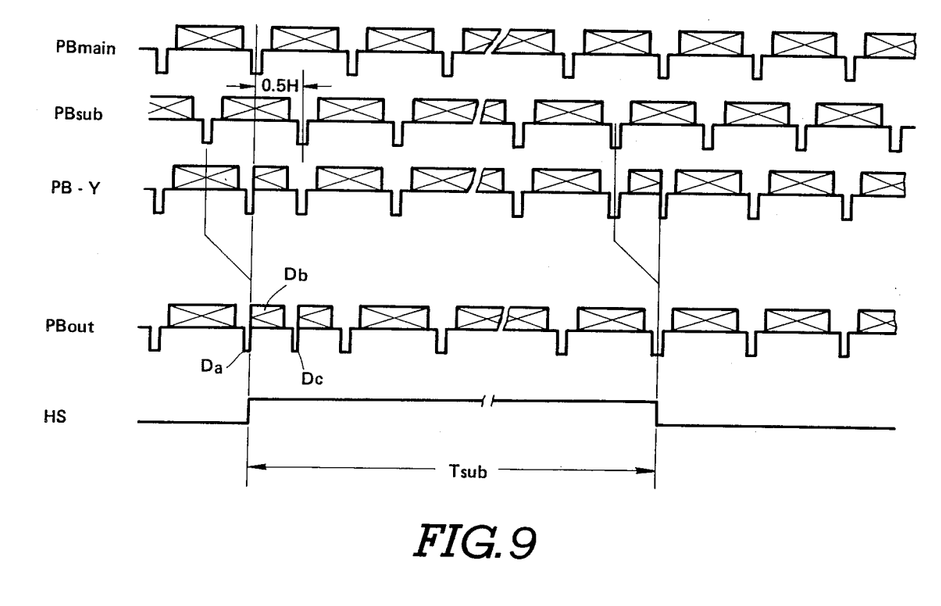
FIG. 9 is a timing chart of signals in a conventional VTR shown in FIG. 8.

FIG. 9 shows a timing chart indicating the operation of a conventional 8 mm VTR. It is noted that in the SP mode, the reproduced video signal PBmain derived through the normal playback head 52 is reproduced 0.5H in advance of the reproduced video signal PBsub obtained through the auxiliary head 53, as shown in FIG. 9.

In addition, the selection switch 56 is responsive to a head select signal HS to select either of the two reproduced video signals. The timing of the head select signal HS is such that one of the reproduced video signals PBmain, PBsub is selected which has been derived during the tracing of the normal playback head 52 and the auxiliary playback head 53 on their corresponding azimuth angle recorded tracks when variable speed reproduction is carried out.

The Y/C separation circuit 77 separates the reproduced video signal received via the signal section switch 56 into a luminance signal Y and a chromatic signal C. The luminance signal Y is sent to a demodulation circuit 58. The chromatic signal C is sent to a signal mixer 60 via a chromatic signal processing circuit 59. The reproduced luminance signal PB.Y derived by the demodulation circuit 58 is sent to a 1H delay line (1H DL) 62 or to a 0.5H delay line (0.5H DL) 63 via signal selection switch 61 for drop out compensation. Furthermore, the luminance signal PB.Y is sent to a synchronization separation circuit 65.

The signal selection switch 64 is responsive to the head select signal HS together with the signal selection switch 56 in the variable reproduction operation mode. The reproduced luminance signal PB.Y is sent to the synchronization separation circuit 65 and to the signal mixer 60 via the 0.5H delay line 63 during a selected interval Tsub of the auxiliary head 53. It is noted that the signal selection switch 61 and 1H delay line 62 constitute a drop out compensation circuit in a normal speed reproduction operation mode. When the drop out occurs, the reproduced luminance signal PB.Y with a 1H delay is sent to the synchronization separation circuit 65 and to the signal mixer 60. The signal mixer 60 synthesizes the reproduced video signal PBout from the reproduced chromatic signal and luminance signal and outputs the reproduced video signal PBout via a signal output terminal 66.

In the conventional 8 mm VTR in which the continuity of H is assured in the variable speed reproduction mode with the 0.5H delay line provided in the processing system of the reproduced luminance signal PB.Y, only the luminance signal Y can be corrected. In addition, an out-of-synchronization part (Da), an image deviation part (Db), and black color drop part (Dc) occur in the reproduced video signal PBout as shown in the timing chart of FIG. 9 so that the variable speed reproduction operation cannot be carried out with good picture quality.

SUMMARY OF THE INVENTION

It is an object of the present invention to provide a magnetic recording and reproducing apparatus of the type having an operation mode in which the video signal is recorded in a record format with a deviation in the H alignment between mutually adjoining tracks but which is nevertheless capable of carrying out a variable speed reproduction operation with good picture quality and without the occurrence of out-of-synchronization, image deviation, and black color drop parts in the reproduced video signal during the variable speed reproduction operation.

The above-described objects can be achieved by providing an improved magnetic recording and reproducing apparatus of the type having a normal, rotary, record/playback magnetic head and an operation mode, such as a variable speed operation mode, in which a video signal is recorded in accordance with a record format in which the H (horizontal synchronization) alignment deviates between adjoining tracks, wherein the improvement comprises: (a) at least one auxiliary rotary magnetic head which can be selectively used in place of the normal record/playback magnetic head in a variable speed reproduction mode; (b) a delay circuit for receiving a reproduced video signal and delaying it by an amount corresponding to one horizontal synchronization interval (1H) and having a first output terminal through which the 1H delayed, reproduced video signal is outputted, the delay circuit also delaying the reproduced video signal by a delay amount corresponding to the deviation of the H alignment and having a second output terminal through which the reproduced video signal delayed by the amount corresponding to the deviation of the H alignment is outputted; and (c) switch circuitry which sequentially selects any one of the reproduced video signals from the normal or auxiliary playback heads to be sent to the delay circuit and also selects one of the delayed reproduced video signals during an interval for which the auxiliary head is selected and outputs the reproduced video signal with the continuity of the H secured in the variable speed reproduction mode.

DESCRIPTION OF THE PREFERRED EMBODIMENT

Hereinafter, a preferred embodiment of a magnetic recording and reproducing apparatus according to the present invention will be described in detail with reference to the attached drawings in order to facilitate understanding of the present invention.

A conventional 8 mm VTR (video tape recorder) has been described with reference to FIGS. 5 through 8.

Figure 1:
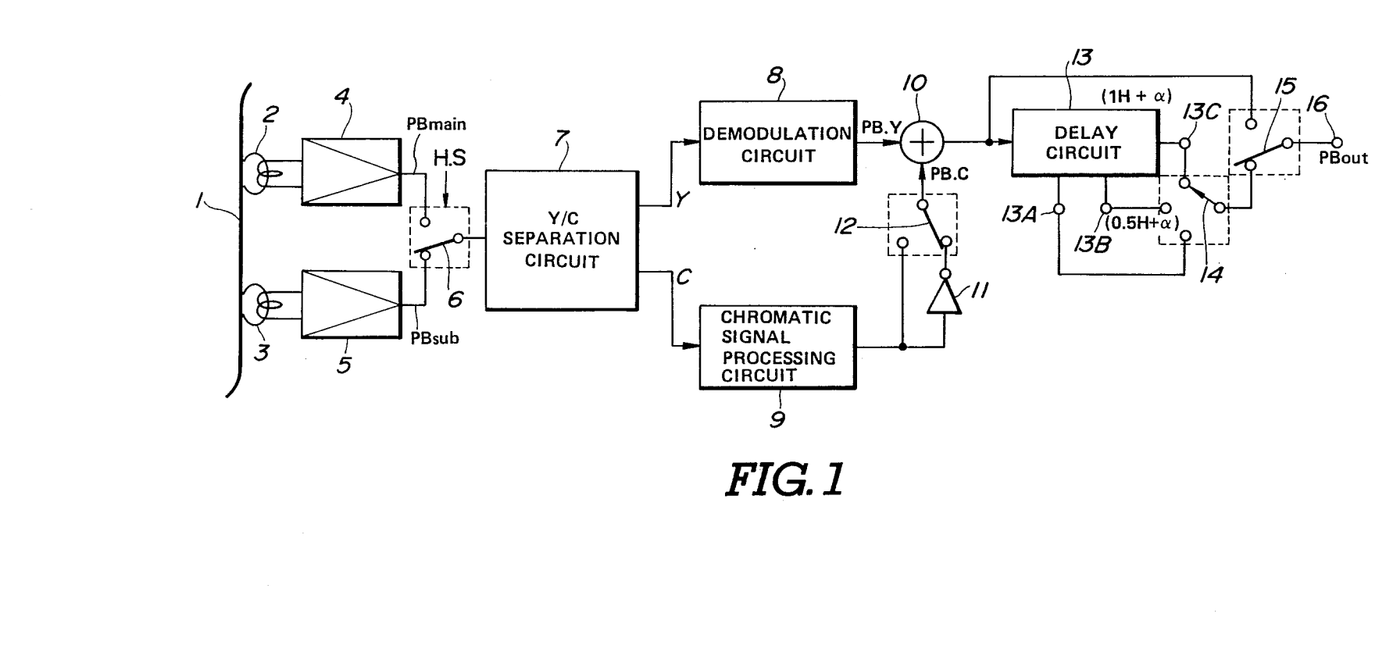
FIG. 1 is a circuit block diagram of a preferred embodiment of a reproduction system in an 8 mm VTR to which a magnetic recording and reproducing apparatus according to the present invention is applicable.

FIG. 1 shows a circuit block diagram of the preferred embodiment of the reproduction system in an 8 mm VTR to which the present invention is applicable. In this embodiment, the reproduced video signal PBmain derived through the normal playback head 2 and the reproduced video signal PBsub derived through the auxiliary head 3 are amplified by means of separate playback amplifiers 4, 5, respectively. One of the amplified reproduced video signals is sent to the Y/C separation circuit 7 via the signal selection switch 6.

Figure 2:
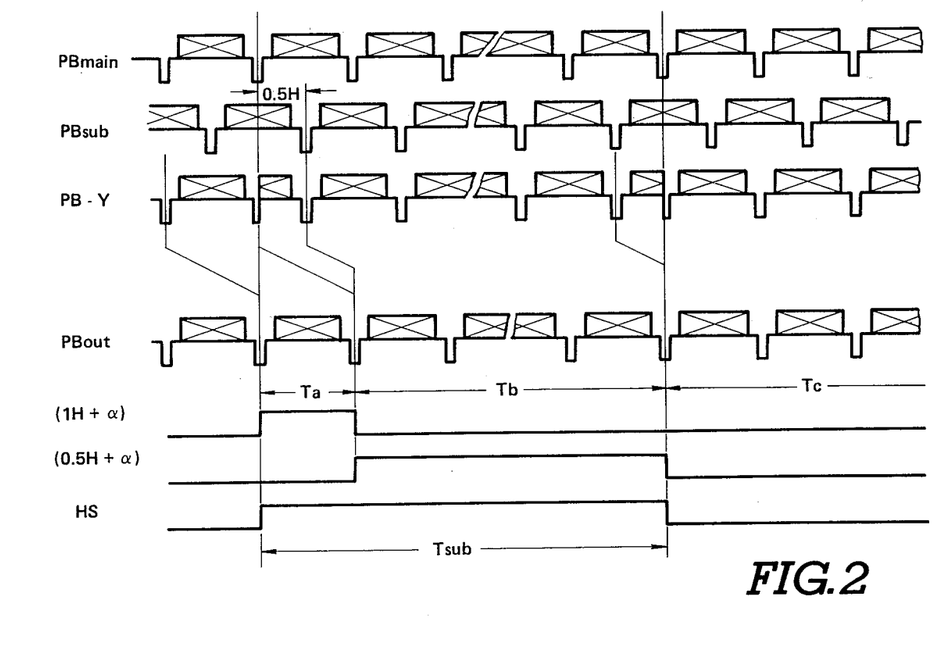
FIG. 2 is a signal timing chart for explaining the operation of the preferred embodiment shown in FIG. 1.

FIG. 2 shows the signal timing chart of the signals in the 8 mm VTR shown in FIG. 1 in the SP mode.

It is noted that the video signal PB main recorded on the magnetic tape 1 and derived through the normal playback head 2 is reproduced only 0.5H in advance of the reproduced video signal PBsub recorded on the magnetic tape 1 and derived through the auxiliary head 3 as shown in FIG. 2 in the SP (Standard Play) mode.

The Y/C separation circuit 7 separates the reproduced video signal received via the signal selection switch 6 into the luminance signal Y and chromatic signal C in the same way as the conventional 8 mm VTR shown in FIG. 8. The separated luminance signal Y is sent to a demodulation circuit 8. The chromatic signal C is then sent to a chromatic signal processing circuit 9 also in the same way as in the conventional 8 mm VTR. The reproduced luminance signal PB.Y derived through the demodulation circuit 8 is sent to a signal mixer 10. In addition, the reproduced chromatic signal (PB.C) derived at the chromatic signal processing circuit 9 is sent to one terminal of a signal selection switch 12 directly and to another terminal of the switch 12 via an invertor 11. The reproduced chromatic signal (PB.C) is, in turn, sent to a signal mixer 10 via the signal selection switch 12. The signal mixer 10 forms a video signal by mixing the reproduced luminance signal PB.Y and the reproduced chromatic signal (PB.C) and the mixed video signal is sent to a delay circuit 13 and one terminal of a signal selection switch 15.

The delay circuit 13, as shown in FIG. 1, comprises: a first delay output terminal 13A from which the video signal inputted from the mixer 10, delayed by a minute amount ($\alpha$), is outputted; a second delay output terminal 13B from which the video signal inputted from the mixer 10 but delayed by an amount $0.5H+\alpha$ corresponding to the sum of the deviation of the H alignment and the minute amount is outputted; and a third delay output terminal 13C from which the video signal inputted from the mixer 10, but delayed by the minute delay amount ($\alpha$) added to a delay amount of 1H which corresponds to one horizontal synchronization interval, (i.e. $1H+\alpha$) is outputted. Each delayed output video signal derived through the first, second and third delay output terminals 13A, 13B, 13C in the delay circuit 13 is selected by means of the signal selection switch 14 and the selected, delayed video signal is sent to the final stage of the signal selection switch 15.

Referring again to FIGS. 1 and 2, the signal selection switch 6 is controlled in response to the head select signal HS in the same way as the conventional 8 mm VTR shown in FIG. 8. The head select signal HS selects either of the reproduced video signals PBmain, PBsub derived during the trace over the record tracks having azimuths respectively corresponding to the normal playback head 2 and auxiliary head 3. In addition, the signal selection switch 14 is controlled so as to select any one of the respective delay output video signals derived through the delay circuit 13. That is to say, the signal selection switch 14 selects the delayed output video signal with the delay amount of (1H+α) derived through the third delay output terminal 13C during the first 1H (one horizontal synchronization) interval Ta of a selection interval Tsub at which the head select signal HS controls the switch 6 so as to select one side of the auxiliary head 3, selects the delayed output video signal with the delay amount of (0.5H+α) derived through the second delay output terminal 13B during the remaining interval Tb of the selection interval Tsub, and selects the delayed output video signal with the delay amount of (α) derived through the first delay output terminal 13A during another interval Tc, which is all of the remaining time except the selection interval Tsub for the auxiliary head 3.

The signal selection switch 14 is controlled in the way described above by means of a system controller (not shown). Furthermore, the signal selection switch 12 selects the reproduced chromatic signal PB.Y derived from the chromatic signal processing circuit 9. The selection switch 12 selects a phase inverted (180°) output signal derived from the invertor 11 during the first 1H interval Ta during which the signal selection switch 14 selects the above-described delayed (1H+α) output video signal from the third delay output terminal 13C.

A signal selection switch 15 selects either the video signal directly sent from the signal mixer 10 or the video signal derived from the signal selection switch 14 for which the corresponding predetermined delay amount described above is provided. The signal selection switch 15 is controlled so as to select the video signal directly sent from the signal mixer 10 in the normal playback operation mode and selects the delayed video signal by means of the delay circuit 13 in the variable speed reproduction operation mode.

It is noted that the signal selection switches are all controlled by a system controller (not shown).

The continuity of H is corrected in such a way that each signal selection switch 6, 12, and 14 is controlled so as to select each input signal as described above in the variable speed reproduction operation mode. As shown in the timing chart of FIG. 2, a reproduced video signal PBout can be obtained which provides good picture quality through a signal output terminal 16 without generation of out-of synchronization, image derivation, and black color drop parts in the video images.

It should be noted that the minute delay amount (α) (substantially in a range of from zero to 0.5H) set in the delay circuit 13 is provided so as to impart an operation characteristic of the delay circuit 13 to each signal so that the gain and temperature characteristic of the delay circuit 13 do not affect each delayed output video signal from the delay circuit and a nodelay video signal, i.e. not passed through the delay circuit 13. The minute delay amount (α) may alternatively be zero (α=0).

Figure 3:
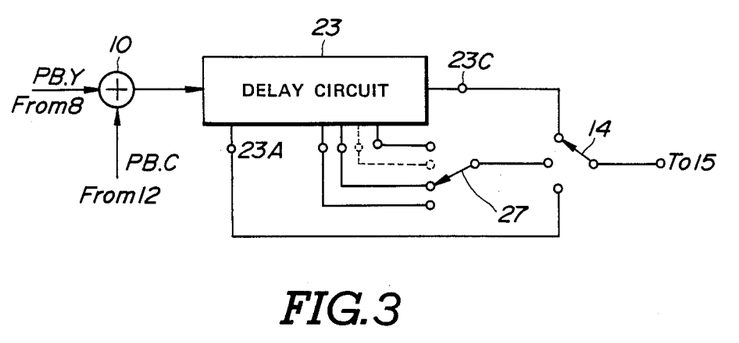
FIG. 3 is a circuit block diagram of an essential part of a first modification of a delay circuit shown in FIG. 1.

FIG. 3 shows a first modification of the delay circuit 13 shown in FIG. 1. Connections to the other circuits are the same as shown in FIG. 1.

If a skew occurs during the switching operation of the head select signal HS due to jitter, and so on, the time axis of the reproduced video signal becomes discontinuous and therefore noise may occur in the video signal. For example, in the 8 mm VTR, a skew having approximately 2 μsec occurs. The influence of the skew on the time axis may be prevented by using another delay circuit 23 which is provided with a plurality of output taps through which delay amounts in the vicinity of 0.5H are derived as shown in FIG. 3 and an additional signal selection switch 27 outputs selectively a delayed output signal having a delay amount in the vicinity of 0.5H derived through one of the above-described output taps. It is noted that numeral 23A corresponds to 13A and numeral 23C to 13C.

Figure 4:
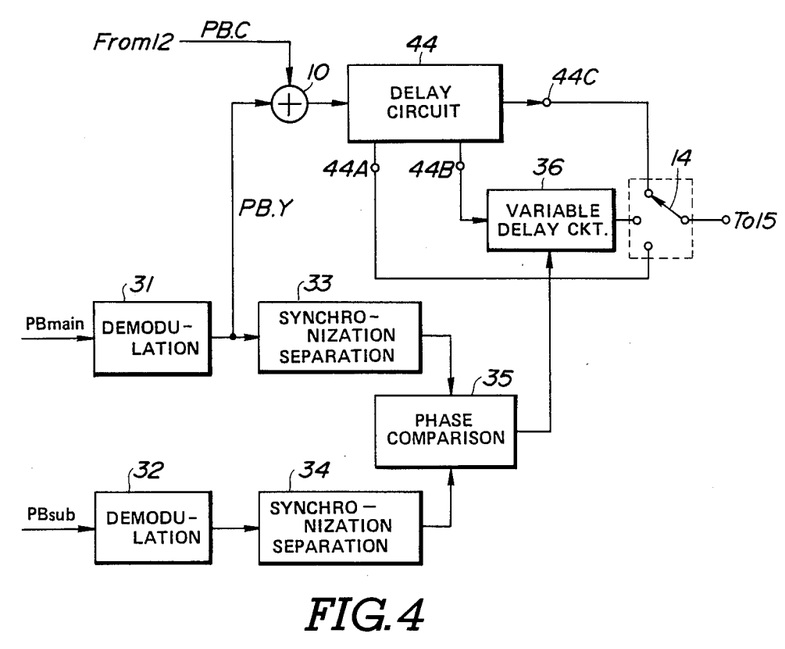
FIG. 4 is a circuit block diagram of an essential part of a second, modification of the delay circuit shown in FIG. 1.

FIG. 4 shows another modification of the delay circuit 13 shown in FIG. 1. Connections to the other circuits are the same as shown in FIG. 1.

As shown FIG. 4, in order to detect the skew occurring in the selection between the normal playback head 2 and auxiliary head 3, luminance signal demodulation circuits 31, 32 and synchronization separation circuits 33, 34 exclusively used for reproduced video signals PBmain, PBsub, respectively, are provided. A phase comparator 35, in addition, carries out a phase comparison between each synchronization signal derived from the two synchronization separation circuits 33, 34. Another delay circuit 44 is provided to produce the reproduced video signal having a delay amount in the vicinity of 0.5H via a variable delay circuit 36 in which a delay amount is variably controlled according to a phase error amount derived by means of the phase comparator 35. Consequently, the above-described skew is automatically compensated so that the 8 mm VTR can achieve the variable speed reproduction operation with a better picture quality.

As appreciated from the above-described preferred embodiment, the magnetic recording and reproducing apparatus according to the present invention can provide a reproduced video signal resulting in an extremely good picture quality, the continuity of H being secured without generation of out-of-synchronization, image deviation, and black color drop parts in the video images during variable speed reproduction operations.

It will clearly be understood by those skilled in the art that the foregoing description is made in terms of the preferred embodiment and various modifications may be made without departing from the scope of the present invention which is to be defined by the appended claims.

What is claimed is:

1. A magnetic recording and reproducing apparatus of the type having a normal record/playback magnetic head and a variable speed operation mode in which a video signal is recorded in accordance with a record format in which the H (horizontal synchronization) alignment deviates between adjoining tracks, the apparatus comprising:

(a) at least one auxiliary rotary magnetic head which can be selectively used in place of the normal record/playback magnetic head in the variable speed reproduction mode;
   (b) a delay circuit for receiving a reproduced video signal and delaying it by an amount corresponding to one horizontal synchronization interval (1H)

and having a first output terminal through which the 1H delayed, reproduced video signal is outputted, the delay circuit also delaying the reproduced video signal by a delay amount corresponding to the deviation of the H alignment and having a second output terminal through which the reproduced video signal delayed by the amount corresponding to the deviation of the H alignment is outputted and wherein the delay circuit has a third output terminal and outputs from this third output terminal the reproduced video signal delayed by a minute delay amount substantially in a range of from zero to the deviation of the H alignment; and (c) switch circuitry which sequentially selects the reproduced video signal from the delay circuit's first output terminal with the delay amount corresponding to 1H during a first 1H portion of the interval for which the auxiliary head is selected, selects the reproduced video signal from the delay circuit's second output terminal with the delay amount corresponding to the deviation of the H alignment during the remaining portion of the interval for which the auxiliary head is selected in the variable speed reproduction mode and selects the reproduced video signal with the minute delay amount derived from the third output terminal of the delay circuit during another interval for which the auxiliary head is not selected in the variable speed reproduction mode, and outputs the reproduced video signal with continuity of the H alignment in the variable speed reproduction mode secured.

2. The magnetic recording and reproducing apparatus according to claim 1, wherein the first output terminal of the delay circuit outputs the delayed reproduced video signal with a delay amount corresponding to 1H plus the minute delay amount (1H+α) and the second output terminal thereof outputs the delayed reproduced video signal with a delay amount corresponding to 0.5H deviation of the H alignment plus the minute delay amount (0.5H+α).

3. The magnetic recording and reproducing apparatus according to claim 2, wherein the normal record/playback head has an inverse azimuth with respect to the auxiliary head and the reproduced video signal derived through the normal record/playback head is 0.5H in advance of the reproduced video signal derived through the auxiliary head.

4. The magnetic recording and reproducing apparatus according to claim 1, wherein the delay circuit has gain and temperature characteristics and the minute delay amount is chosen with the operational characteristics of the delay circuit taken into account so that at least the gain and temperature characteristic of the delay circuit do not affect the reproduced video signal passed through the delay circuit and the reproduced video signal not passed through the delay circuit.

5. The magnetic recording and reproducing apparatus according to claim 4, wherein the minute delay amount is zero.

6. The magnetic recording and reproducing apparatus according to claim 1, wherein the delay circuit further comprises a plurality of output taps from which the reproduced video signals are outputted with individual delay amounts substantially in the vicinity of 0.

7. The magnetic recording and reproducing apparatus according to claim 1 which further comprises: skew detection means for detecting a skew between the normal record/playback head and the auxiliary head and outputting a signal indicative thereof; and a variable delay circuit which is responsive to the output signal from the skew detection means and is provided between the second output terminal of the delay circuit and the switch circuitry, for providing a further delay amount added to the reproduced signal from the second output terminal, which further delay amount is varied according to a magnitude of the skew detected by the skew detecting means.

8. The magnetic recording and reproducing apparatus according to claim 7, wherein the skew detecting means comprises a pair of luminance signal demodulators and synchronization separation circuits respectively receiving the reproduced video signals derived through the normal record/playback head and the auxiliary head and a phase comparator which compares the phases between the respective synchronization signals derived through the synchronization separation circuits and outputs a phase error signal to the variable delay circuit.

9. A magnetic recording and reproducing method of the type in which a video signal is recorded in accordance with a record format in which the H (horizontal synchronization) alignment deviates between adjoining tracks, the method comprising the steps of:

(a) selecting from between video signals reproduced by a normal record/playback head or an auxiliary head, delaying the selected reproduced video signal by an amount corresponding to one horizontal synchronization interval (1H), and outputting the delayed signal from a first output terminal;

(b) selecting from between video signals reproduced by a normal record/playback head or an auxiliary head, delaying the selected reproduced video signal by an amount corresponding to the deviation of the H alignment and outputting the reproduced video signal delayed by an amount corresponding to the deviation of the H alignment from a second output terminal, wherein during a time interval Tsub the reproduced video signal selected to be delayed is the video signal reproduced by the auxiliary head;

(c) selecting form between video signals reproduced by a normal record/playback head or an auxiliary head, delaying the selected reproduced video signal by a minute delay amount substantially in a range of from zero to the deviation o the H alignment and outputting said signal at a third output terminal; and (d) selecting the delayed reproduced video signal from the first output terminal with the delay amount corresponding to 1H during a first 1H portion of the interval Tsub, selecting the reproduced video signal from the second output terminal with the delay amount corresponding to the deviation of the H alignment during the remaining portion of the interval Tsub in the variable speed reproduction mode, and selecting the delayed, reproduced video signal with the minute delay amount from the third output terminal during an interval for which the auxiliary head is not selected as the source of the reproduced video signal to be delayed in the variable speed reproduction mode.

10. The magnetic recording and reproducing method according to claim 9, wherein (a) the step of outputting the delayed, reproduced video signal from the first output terminal comprises outputting the reproduced video signal with a delay amount corresponding to 1H plus a minute delay amount (1H+α); and (b) the step of outputting the delayed, reproduced video signal from the second output terminal comprises outputting the reproduced video signal with a delay amount corresponding to a 0.

11. The magnetic recording and reproducing method according to claim 10, wherein the normal record/playback head has an inverse azimuth with respect to the auxiliary head and the reproduced video signal selected from the normal record/playback head is 0.5H in advance of the reproduced video signal selected from the auxiliary head.

12. The magnetic recording and reproducing method according to claim 10, wherein the minute delay amount is zero.

13. The magnetic recording and reproducing method according to claim 9, wherein the delay steps further comprise outputting the reproduced video signal at a plurality of output taps with individual delay amounts substantially in the vicinity of 0.

14. The magnetic recording and reproducing method according to claim 9 which further comprises:
 (a) detecting a skew between the normal record/playback head and the auxiliary head; and
 (b) providing a further delay amount added to the reproduced signal from the second output terminal, which further delay amount is varied according to the magnitude of the detected skew.

15. The magnetic recording and reproducing method according to claim 14, wherein the skew detecting step comprises
 (a) demodulating the luminance signals from the reproduced video signals derived through the normal record/playback head and the auxiliary head;
 (b) separating the synchronization signals from each of the demodulated luminance signals; and
 (c) comparing the phases between the respective synchronization signals to detect the skew.

* * * * *